(12) United States Patent
Liljenquist

(10) Patent No.: US 6,893,496 B1
(45) Date of Patent: May 17, 2005

(54) CEMENT COMPOSITIONS AND ADMIXTURES THEREFORE

(75) Inventor: Vaughn R. Liljenquist, Glendale, AZ (US)

(73) Assignee: Universal White Cement Company, Inc., Glendale, AZ (US)

( * ) Notice: Subject to any disclaimer, the term of this patent is extended or adjusted under 35 U.S.C. 154(b) by 389 days.

(21) Appl. No.: 10/320,074

(22) Filed: Dec. 16, 2002

(51) Int. Cl.⁷ .......................... C04B 14/08; C04B 14/38
(52) U.S. Cl. ...................... 106/719; 106/681; 106/716; 106/718; 106/801; 106/803; 106/811; 106/820; 106/823; 106/DIG. 4; 524/5; 524/9
(58) Field of Search ................................ 106/681, 716, 106/718, 719, 801, 803, 811, 820, 823, DIG. 4; 524/5, 9

(56) References Cited

U.S. PATENT DOCUMENTS

| | | |
|---|---|---|
| RE16,732 E | 9/1927 | Wig |
| 2,336,723 A | 12/1943 | Drummond |
| 2,747,994 A * | 5/1956 | Hoopes |
| 4,030,939 A | 6/1977 | Mallow |
| 4,410,366 A | 10/1983 | Birchall et al. |
| 5,122,191 A | 6/1992 | Morozumi et al. |
| 5,192,366 A | 3/1993 | Nishioka et al. |
| 5,498,665 A | 3/1996 | Schulze et al. |
| 5,588,990 A | 12/1996 | Dongell |
| 5,633,310 A | 5/1997 | Sulser et al. |
| 5,718,757 A | 2/1998 | Guillou et al. |
| 5,749,961 A | 5/1998 | Jaklin |
| 5,891,235 A | 4/1999 | Suzuki et al. |
| 6,153,673 A | 11/2000 | Lemos et al. |
| 6,324,802 B1 | 12/2001 | Garrett |
| 2001/0015155 A1 | 8/2001 | Kinari et al. |

FOREIGN PATENT DOCUMENTS

| | | |
|---|---|---|
| EP | 1016638 A2 | 7/2000 |
| JP | 11-12066 A * | 1/1999 |
| WO | WO 97/21639 | 6/1997 |
| WO | WO 00/47533 | 2/2000 |

* cited by examiner

Primary Examiner—Anthony J. Green
(74) Attorney, Agent, or Firm—Frank J. McGue

(57) ABSTRACT

Blended cement compositions for mixture with aggregate and water to prepare cementitious products. Such blended cement compositions contain cement, calcined diatomaceous earth, calcined kaolin, fiberous material and reactive vinyl acetate co-polymers, with or without talc and/or bentonite or their functional equivalents. Admixtures for blending into cement to create such blended cements or their read-mix equivalents contain calcined kaolin, calcined diatomaceous earth, fiberous material and reactive vinyl acetate co-polymers, with or without talc and/or bentonite or their functional equivalents.

15 Claims, No Drawings

CEMENT COMPOSITIONS AND ADMIXTURES THEREFORE

TECHNICAL FIELD

This invention relates in general to the field of cementitious products, and, more particularly, to improved cement compositions and admixtures for making cementitious products which have increased hardness, increased moisture hold, reduced cracking upon shrinkage and increased workability and ease of pumping.

BACKGROUND OF THE INVENTION

The making and using of cementitious products is an old art. However, cementitious products include a wide variety of materials, both naturally occurring and artificial. Each material possesses different properties and, as a result, performs differently within a particular cementitious product depending upon many variables. The fineness of the materials, the degree of calcination, the chemical and physical makeup of all the components are just a few of the variables of a cementitious product which render no two cementitious products exactly alike. The resulting performance of each cementitious product must therefore be analyzed for the effect desired, because there is no sure way to predict how a given cementitious product formulation will perform until it is tested.

Some prior art formulations are found in U.S. Pat. No. 5,588,990 entitled "Pozzolan Cement Compositions and Admixtures Therefor" which issued on Dec. 31, 1996 to Dongell and is owned by the assignee of the present invention describes the use of blended cement compositions and admixtures for mixture with aggregate and water to form cementitious products which produces less permeability, greater durability, greater workability, greater resistance to early attack from chemicals and aggressive water and less heat of hydration to control setting speeds.

U.S. Pat. No. 5,498,665 entitled "Use of Polypropylene Glycol as a Shrinkage-Reducing Additve in Dispersion Powder Compositions for Construction Materials" which issued on Mar. 12, 1996 to Schulze et al. discloses a redispersable dispersion powder composition which includes a base polymer such as copolymers of vinyl acetate, plus silicon foaming inhibitors or foaming inhibitor based upon liquid hydrocarbons (abstract, claims 1 and 7).

U.S. Pat. No. 5,749,961 entitled "Concrete or Mortar Resistant to Spalling Under Fire Attack" which issued on May 12, 1998 to Jaklin provides a high strength concrete resistant to spalling which includes a silicate of magnesium while the organic fibers consist of polyolefins, polyamides or polyesters (abstract, claims 1 and 6).

PCT Application No. PCT/EP00/00999 entitled "Powdery Polyethercarboxylate-Based Polymeric Compositions" which was published on Aug. 17, 2000 and was filed by Albrecht et al. shows a polymeric cement composition which includes support material selected from the group consisting of chalk, silica, calcite, dolomite, quartz flour, bentonite, ground pumice, titanium dioxide, fly ash, cement (Portland cement, blast furnace 5 cement), aluminum silicate, talc, anhydrite, lime, mica, kieselguhr, gypsum, magnesite, alumina, kaolin, ground slate and other rocks, barium sulfate and mixtures of these materials (claim 5).

PCT Application PCT/FR96/01894 entitled "Novel Binding Phase for Phosporus-Magnesium Cements and Use Therefor for Preparing Mortars" which was published on Jun. 19, 1997 and was filed by Orange et al. discloses a phosphomagnesium cement composition which includes a mineral compound selected from $TiO_2$, $Al_2O_3$, $ZrO_2$, $CaCO_3$, talc, mica, kaolin, wollastonite, bentonite and metakaolin (claim 5).

However, there is always a need to improve current cementitious formulations. Continuing research has indicated a need for increased hardness, increased moisture hold, reduced cracking upon shrinkage and increased workability and ease of pumping in cementitious products.

The present invention meets this need.

SUMMARY OF THE INVENTION

It is an object of this invention to provide a cementitious product providing increased hardness, increased moisture hold, reduced cracking upon shrinkage and increased workability and ease of pumping.

It is an object of this invention to provide an admixture for cementitious products providing increased hardness, increased moisture hold, reduced cracking upon shrinkage and increased workability and ease of pumping.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

The present invention relates generally to unique blended cements and admixtures for the making of cementitious products. Specifically, the present disclosure describes unique blended cement and admixture compositions that possess increased hardness, increased moisture hold, reduced cracking upon shrinkage and increased workability and ease of pumping.

The present invention comprises the addition of fibrous material in combination with a reactive vinyl acetate co-polymers to a cementitious product or admixture therefore.

When the blended cement of the present invention comprises only Portland cement, calcined diatomaceous earth and calcined kaolin, the preferred ranges for these elements are from about 60% to 85% of Portland cement, from about 13% to 27% of calcined diatomaceous earth and from about 13% to 27% of calcined kaolin.

When the blended cement of the present invention also include talc, the preferred ranges for these elements are from about 60% to 85% of Portland cement, from about 7% to 27% of calcined diatomaceous earth, from about 8% to 27% of calcined kaolin and from about 4% to 9% of talc.

When the blended cement of the present invention also includes bentonite, the preferred ranges for these elements are from about 60% to 85% of Portland cement, from about 8% to 27% of calcined diatomaceous earth, from about 9% to 27% of calcined kaolin and from about 2% to 8% of bentonite.

When the blended cement of the present invention includes both talc and bentonite, the preferred ranges for these elements are from about 60% to 85% of Portland cement, 5% to 27% of calcined diatomaceous earth, from about 7% to 27% of calcined kaolin, from about 4% to 9% of talc and from about 2.5% to 8% of bentonite.

When the admixture of the present invention comprises only calcined diatomaceous earth and calcined kaolin, the preferred ranges for these elements are from 33% to 67% of calcined diatomaceous earth and from 33% to 67% of calcined kaolin.

When the admixture of the present invention also include talc, the preferred ranges for these elements are 17.5% to 67% of calcined diatomaceous earth, from 20% to 67% of calcined kaolin and from about 10% to 22.5% of talc.

When the admixture of the present invention also includes bentonite, the preferred ranges for these elements are from about 20% to 67% of calcined diatomaceous earth, from 22.5% to 67% of calcined kaolin and from about 6% to 20% of bentonite.

When the admixture of the present invention includes both talc and bentonite, the preferred ranges for these elements are from about 12.5% to 67% of calcined diatomaceous earth, from about 17.5% to 67% of calcined kaolin, from about 10% to 22.5% of talc and from about 6% to 20% of bentonite.

In the preferred embodiment, the fibrous material comprises polyethylene co-polymer fibers of between 0.5080 millimeters (2/100 inch) to 2.54 millimeters (1/10 inch) in length. In the most preferred embodiments, the fibrous material is provided as a mixture of those two lengths. Such products are commercially available, for example, the Hi-Fibe product line sold by the Hill Brothers Chemical Co. of Orange, Calif. In the preferred embodiments, a range of ¼ pound to two pounds, most preferably 1.4 pounds of fibrous material is used in a 100 pound ready to use cement mixture while a range of 2½ pounds to 20 pounds, most preferably 15 pounds of said fibrous material is used in a 100 pound admixture formula. In the most preferred embodiments, the each pound of fibrous material comprises a ratio of between an 8:1 to 16:1 of long fibers to short fibers.

In the preferred embodiment, the preferred range of the reactive vinyl acetate co-polymers is ¼ pound to 2 pounds per hundred pounds of ready to use cement mixture, most preferably about 1¼ pounds, and about 3.4 pound to about 27 pounds per hundred pound of admixture, most preferably about 17 pounds. Such reactive vinyl acetate co-polymers are commercially available under the Elotex or Elvace brand names from National Starch & Chemical of Bridgewater, N.J. or Hills Brothers Chemical Co.

The cement admixtures described herein disclosed are analogous to the cement formulations of the present invention except that the admixtures do not contain cement but do contain the other ingredients in relative proportions essentially equivalent to those stipulated for the corresponding blended cements, said blended cement having from about 15% to about 40% by weight of said admixture blended therein. The admixtures anticipate those situations where the admixtures are to be added to a cement, a blended cement, or a ready to mix wet cementitious formulation to make the final product.

To further aid in understanding of the present invention and not by way of limitation, the following examples are presented. Unless otherwise noted, the amounts and ratios given below are determined by weight.

EXAMPLE I

Three samples were made and molded into 8"×4" cylinders for compression tests conducted according to ASTM Standard C109 using lime water for cure.

Sample 1 was a blended cement of the present invention which was prepared by mixing together until well blended 2.26 pounds of calcined kaolin, 1 pound of talc, 0.03 pounds of calcined diatomaceous earth, 0.06 pounds of bentonite, 23.13 pounds of cement, 51 pounds of sand, 1.4 pounds of vinyl acetate co-polymer, 1.125 pounds of fibrous material to make a composition of the present invention. The mixture is combined with sufficient water until a workable concrete is prepared.

Sample 2 was a non-pozzolan cementitious product and was prepared by combining and blending white Portland cement Type I, limestone sand and gravel in a 1:2:4 mix ratio of cement to sand to gravel, and a 1.0:0.5 ratio of water to cement.

Sample 3 was a pozzolan cementitious product as set forth in U.S. Pat. No. 5,588,990 and was prepared by combining and blending 69% of white Portland cement Type I, 7% of talc, 8% of calcined diatomaceous earth, 11% of calcined kaolin and 5% of bentonite containing potassium The above combination was mixed with a 1:2:4 ratio of cement to sand to gravel and a 1:0.6 ratio of cement to water. The results are given below for compression strength, in pounds per square inch:

TABLE 1

| Lapsed Time | Sample 1 | Sample 2 | Sample 3 | C150 | C595 |
|---|---|---|---|---|---|
| 3 days | 4380 | 1200 | 910 | 1800 | 1800 |
| 7 days | 6170 | 3315 | 2245 | 2800 | 2800 |
| 28 days | 6760 | 4400 | 3620 | 4000 | 3500 |

The last two columns refer to American Society for Testing and Materials, Standard Specification for Portland cement, tests C150 and C595. Sample 1, a formulation of the present invention, complies with both standards at all lapsed times.

EXAMPLE II

An admixture is prepared by mixing together approximately 4.25 parts of calcined kaolin, 2.25 parts of calcined kaolin, 2.25 parts of talc, 1 part of calcined diatomaceous earth, 2.0 parts of bentonite, 2.38 parts of vinyl acetate co-polymer, 2.12 parts of fibrous material to make a composition of the present invention A cementitious product is prepared by blending about 30% of the admixture prepared above with 70% of a ready mixed cementitious product.

Although only certain embodiments have been illustrated and described, it will be apparent to those skilled in the art that various changes and modifications may be made therein without departing from the spirit of the invention or from the scope of the appended claims.

What is claimed is:

1. An admixture for subsequent addition to Portland cement to create a blended cement, said blended cement having from about 15% to about 40% by weight of said admixture blended therein, said admixture comprising: from about 12.5% to about 67% by weight of calcined diatomaceous earth; from about 17.5% to about 67% by weight of calcined kaolin; from about 0% to about 22.5% by weight of talc; from about 0% to about 20% by weight of bentonite; from about 2½% % to 20% by weight of fibrous material and from about 3.4% to 27% by weight of reactive vinyl acetate co-polymer.

2. The admixture of claim 1 wherein the fibrous material has a length of between 0.5080 millimeters to 2.54 millimeters.

3. The admixture of claim 2 wherein the fibrous material consists of a mixture of two lengths of fibers.

4. The admixture of claim 3 wherein one of the two lengths is about 0.5080 millimeters and the other of the two lengths is about 2.54 millimeters.

5. The admixture of claim 1 comprising about 15% by weight of fibrous material.

6. The admixture of claim 1 comprising about 17% by weight of reactive vinyl acetate co-polymer.

7. The admixture of claim 1 comprising about 15% by weight of fibrous material and about 17% by weight of reactive vinyl acetate co-polymer.

8. A composition of matter comprising water, sand and/or aggregate and, a blended cement containing Portland cement and from about 15% to about 40% by weight of the admixture of claim 1.

9. A composition of matter comprising water and a quantity of dry materials including from about 60% to about 85% by weight of Portland cement; from about 5% to about 27% by weight of calcined diatomaceous earth; from about 7% to about 27% by weight of calcined kaolin; from about 0% to about 9% by weight of talc; from about 0% to about 8% of bentonite; from about 0.25% to 2% by weight of fibrous material and from about 0.25% to 2% by weight of a reactive vinyl acetate co-polymer.

10. The composition of claim 9 wherein the fibrous material has a length of between 0.5080 millimeters to 2.54 millimeters.

11. The composition of claim 10 wherein the fibrous material consists of two lengths of fibers.

12. The composition of claim 11 wherein one of the two lengths is about 0.5080 millimeters and the other of the two lengths is about 2.54 millimeters.

13. The composition of claim 9 comprising about 1.4% by weight of fibrous material.

14. The composition of claim 9 comprising about 1.25% by weight of reactive vinyl acetate co-polymer.

15. The composition of claim 9 comprising about 1.4% by weight of fibrous material and about 1.25% by weight of reactive vinyl acetate co-polymer.

\* \* \* \* \*